United States Patent [19]

Matsushima et al.

[11] Patent Number: 5,026,739
[45] Date of Patent: Jun. 25, 1991

[54] METHODS OF PRODUCING RIGID POLYURETHANE FOAMS FOR INTERIOR OR EXTERIOR USE FOR AUTOMOBILES

[75] Inventors: Yuzo Matsushima; Yoshiyuki Ito, both of Utsunomiya; Satofumi Yamamori, Kawabe, all of Japan

[73] Assignees: Honda Giken Kogyo Kabushiki Kaisha, Tokyo; Takeda Chemical Industries, Ltd., Osaka, both of Japan

[21] Appl. No.: 378,618

[22] Filed: Jul. 12, 1989

[30] Foreign Application Priority Data

Jul. 15, 1988 [JP] Japan .................. 63-176795

[51] Int. Cl.$^5$ .............................................. C08G 18/14
[52] U.S. Cl. ................................................... 521/177
[58] Field of Search ........................................ 521/177

[56] References Cited

U.S. PATENT DOCUMENTS

| | | |
|---|---|---|
| 2,843,568 | 7/1958 | Benning et al. ............ 521/177 |
| 4,440,664 | 4/1984 | Pollock et al. ............. 521/177 |

*Primary Examiner*—Maurice J. Welsh
*Attorney, Agent, or Firm*—Wenderoth, Lind & Ponack

[57] ABSTRACT

A method of producing interior and exterior structural members of automobiles composed of rigid polyurethane foam, which comprises foaming a composition comprising:

(a) polyisocyanates selected from the group consisting of diphenylmethane diisocyanate, polyphenylenepolymethylene polyisocyanate and their modified products; and (b) polyols which have a hydroxyl value of 400–550 and contain an ethylene oxide adduct to hydroquinone having a hydroxyl value of 60–430 in amounts of 20–40% by weight based on the polyols, the adduct being represented by the general formula of

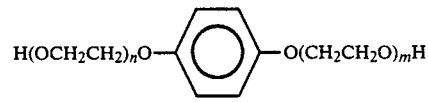

wherein m and n are integers of not less than 1, respectively.

The resultant rigid polyurethane foams have high heat resistance and toughness as well as high mechanical properties, but have no voids therein.

7 Claims, No Drawings

METHODS OF PRODUCING RIGID POLYURETHANE FOAMS FOR INTERIOR OR EXTERIOR USE FOR AUTOMOBILES

This invention relates to a method of producing rigid polyurethane foams as structural members for automobiles for interior or exterior use which are of in particular high heat resistance and durability.

Rigid polyurethane foams have been used for interior and exterior structural members for automobiles, such as door linings, console boxes, dashboard panels or air spoilers. These rigid polyurethane foams have hitherto been produced by the reaction of compositions which contain in principle polyisocyanates, polyols and blowing agents among others.

However, the prior methods of producing rigid polyurethane foams have disadvantages in that the compositions containing polyisocyanates and polyols are of insufficient fluidity so that they are not suitable for use in the production of structural members which have thin walls or need high dimensional accuracy, but also they very often generate voids in the resultant foams. Furthermore, the resultant polyurethane foams are poorly durable. Accordingly, there has been a limit to use of rigid polyurethane foams as structural members of automobiles for interior or exterior use.

In automobile industry in recent years, the application of various resin molds to structural members has been extensively investigated for the purpose of improvement of productivity and cost reduction as well as weight reduction of automobiles. With regard to the application of rigid polyurethane foams to structural members in particular, it is demanded that rigid polyurethane foams have high durability and mechanical strength comparable to the other resin molds, and have no voids therein.

Heretofore, in the production of rigid polyurethane foams, relatively low molecular weight polyols of high functionality have been used as a polyol component. For instance, a method of producing rigid polyurethane foams is disclosed in Japanese Patent Publication No. 57-45770, wherein polyols which contain ethylene oxide or propylene oxide adducts to six to eight functional polyhydric alcohols such as sorbitol or sucrose and ethylene oxide or propylene oxide adducts to glycerine are used to improve toughness of rigid foams. A method is also known wherein polyols which contain alkylene oxide adducts to 4,4'-diaminodiphenylmethane are used as a polyol component in U.S. Pat. No. 4,342,842.

Although, these known rigid polyurethane foams are of good mechanical properties as they are produced, but of insufficient heat resistance, so that when they are used in high temperature circumstances, they lose their strength within a short period of time, and thus they cannot be applied to inferior or exterior use structural members of automobiles.

Therefore, an improved method of producing rigid polyurethane foams has been proposed in Japanese Patent Laid-open No. 59-47223 wherein a mixture of adducts of alkylene oxides to bisphenol A and adducts of alkylene oxides to aromatic polyamino compounds such as 2,6-tolylenediamine are used to improve toughness of rigid foams. Further, the co-use as polyol components of adducts of alkylene oxides to aromatic polyhydric compounds such as hydroquinone is made reference to therein. The resultant rigid foam is allegedly suitable for use as industrial parts, in particular, sliding parts or coating materials. This foam has been improved to an extent in heat resistance, but it has been found still insufficient in mechanical properties such as toughness, so that it cannot be suitably used as inferior or exterior structural members of automobiles.

It is, therefore, an object of the invention to provide a method of producing rigid polyurethane foams as structural members for automobiles for interior or exterior use which are of in particular high heat resistance and durability as well as of excellent mechanical properties such as toughness.

In accordance with the invention, there is provided a method of producing interior and exterior structural members of automobiles composed of rigid polyurethane foam, which comprises foaming a composition comprising:

(a) polyisocyanates selected from the group consisting of diphenylmethane diisocyanate, polyphenylenepolymethylene polyisocyanate and their modified products; and (b) polyols which have a hydroxyl value of 400–550 and contain an ethylene oxide adduct to hydroquinone having a hydroxyl value of 60–430 in amounts of 20–40% by weight based on the polyols, the adduct being represented by the general formula of

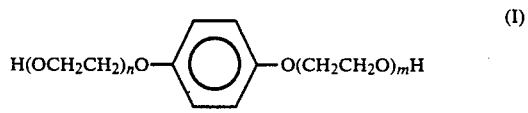

(I)

wherein m and n are integers of not less than 1, respectively.

The composition contains at least one polyisocyanate selected from the group consisting of diphenylmethane diisocyanate, polyphenylenepolymethylene polyisocyanate and their modified products to provide the resultant foams with desired properties as described hereinbefore. The aforesaid modified products include carbodiimide modified products, biuret compounds, dimers, trimers, and isocyanate terminated prepolymers which are obtained by the reaction of the polyisocyanates with compounds having active hydrogens therein. These modified polyisocyanates are well known in the production of polyurethane foams. Other polyisocyanates may be used together when necessary within a limit that they cause no deterioration of resultant rigid foams.

Further, the composition contains polyols which have a hydroxyl value of 400–550, and the polyols contain, as at essential polyol component, an ethylene oxide adduct to hydroquinone having a hydroxyl value of 60–430 in amounts of 20–40% by weight based on the polyols, as represented by the above general formula (I). adduct to hydroquinone as represented by the general formula The adduct may be produced by adding ethylene oxide to hydroquinone or 1,4-bis(hydroxyethoxy)benzene as represented by the formula

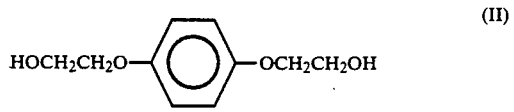

(II)

It is necessary that the adduct (I) has a hydroxyl value of 60–430, preferably of 80–200. When the adduct (I) has a hydroxyl value of less than 60, the resultant rigid polyurethane foams are inferior in mechanical strength, in particular, in flexural strength, as well as in heat resistance. On the other hand, when the adduct (I) has a hydroxyl value of more than 430, the resultant rigid polyurethane foams are improved in heat resistance, but are inferior in toughness, so that the foams may not be put to practical use as interior or exterior structural members of automobiles.

It is further necessary that the adduct (I) is contained in amounts of 20–40% by weight, preferably of 25–35% by weight, based on the whole polyol used. When the adduct is contained in amounts of less than 20% by weight based on the whole polyols used, the resultant rigid polyurethane foams have a large hardness, but a small toughness, and readily deteriorate when used at high temperature. On the other hand, when the adduct is contained in amounts of more than 40% by weight based on the whole polyols used, the resultant rigid polyurethane foams are too small in hardness to use them as structural members.

The polyols used have as a whole a hydroxyl value of 400–550, preferably of 430–500. Therefore, the polyols used may contain any second polyol, in addition to the aforesaid adduct (I) as a first polyol, which puts the hydroxyl value of the entire polyol mixtures in the range of 400–550. However, it is preferred that the second polyols have a hydroxyl value of not less than 400, and most preferably of 450–1000. As these second polyols, there may be used polyester polyols, polyether polyols, polyester polyether polyols or grafted polyols.

More specifically, the polyester polyols may be exemplified by condensation products of glycols such as ethylene glycol, diethylene glycol, propylene glycol, butylene glycol, pentane glycol or hexane glycol, or polyhydic alcohols such as trimethylolpropane or glycerine, with dicarboxylic acids such as adipic acid, sebacic acid, isophthalic acid or phthalic acid.

The polyether polyols used include, for example, adducts of alkylene oxides such as ethylene oxide, propylene oxide or butylene oxide, to polyhydric compounds such as ethylene glycol, propylene glycol, diethylene glycol, dipropylene glycol, glycerine, trimethylolpropane, triethanolamine, pentaerythritol, diglycerine, sorbitol or sucrose. The polyether polyols used may further include adducts of such alkylene oxides as above to ammonia or amine compounds such as monoethanolamine, diethanolamine, ethylenediamine, 4,4′-diaminodiphenylmethane or tolylenediamine.

The polyester polyether polyols used may be prepared by the reaction of such polyether polyols as above with such dicarboxylic acid as before described. The grafted polyols used may be prepared by grafting monomers such as styrene or acrylonitrile onto the polyether polyols as before described.

These second polyols may be used singly or as mixtures of two or more.

Among these polyols are preferred in particular adducts of alkylene oxides to at least one member selected from the group consisting of three or more functional polyhydric alcohols and polyamino compounds. Ethylene oxide, propylene oxide or both are preferred as the alkylene oxides.

The functionality of the polyhydric alcohols and polyamino compounds herein is based on the number of active hydrogens which the compounds possess. Namely, the functionality of the polyhydric alcohols is equal to the number of the hydroxyl groups in the molecule of the alcohols. The polyamino compounds used include such compounds as have only amino groups as functional groups, and such compounds as have, for example, hydroxyl groups in addition to amino groups therein, as functional groups, as exemplified by alkanolamines. The functionality of the former polyamino compounds is equal to the number of active hydrogens of the amino groups of the compounds, whereas the functionality of the latter polyamino compounds or alkanolamines is equal to the number of the hydroxyl groups and active hydrogens of the amino groups of the compounds.

Aliphatic polyhydric alcohols or alicyclic polyhydric alcohols are preferably used as the polyhydric alcohols. Thus, the aliphatic polyhydric alcohols and alicyclic polyhydric alcohols used include, for example, glycerine, trimethylolpropane, pentaerythritol, diglycerine, sorbitol or sucrose. The polyamino compounds having amino groups only as functional groups used may be exemplified by aliphatic polyamines such as (poly)alkylene polyamines, for instance, ethylenediamine, diethylenetriamine or triethylenetetramine, and aromatic polyamines such as 4,4′-diaminodiphenylmethane or tolylenediamine. The alkanolamines used may be exemplified by monoethanolamine, diethanolamine, triethanolamine, monopropanolamine, dipropanolamine or tripropanolamine.

The polyols used may further contain, as a third polyol, adducts of alkylene oxide to glycols such as ethylene glycol, diethylene glycol, propylene glycol or dipropylene glycol. There may be used ethylene oxide, propylene oxide or butylene oxide, for example, as the alkylene oxides, and ethylene oxide or propylene oxide or both are preferred.

Conventional methods may be employed to produce rigid polyurethane foams. The composition is foamed in the presence of blowing agents and catalysts, and where desired, surfactants, fire retardants, colorants, cross-linking agents and the like in a conventional manner. The equivalence ratio of isocyanate groups in the polyisocyanates used to hydroxyl groups in the polyols used, namely NCO/OH ratio or isocyanate index, is usually in the range of 0.9–1.2, preferably of 0.95–1.15, and most preferably of 1.0–1.05.

There may be used any known catalyst, such as amine or metal catalysts. More specifically, the amine catalysts include, for example, triethylamine, triethylenediamine, N,N,N′,N′-tetramethylethylenediamine, tetramethylhexamethylenediamine, tetramethylpropylenediamine, pentamethyldiethylenetriamine, dimethylbenzylamine, N-methylmorpholine and dimethylethanolamine, whereas the metal catalysts include, for example, stannous octanoate or dibutyltin dilaurate. The catalysts may be used singly or as mixtures in usual amounts known in the art.

The blowing agents used include water and halogenated hydrocarbons known in the art, such as trichlorofluoromethane, dichlorodifluoromethane, methylene chloride, trichlorotrifluoroethane, dibromotetrafluoroethane, trichloroethane, and aliphatic hydrocarbons such as pentane or n-hexane. The blowing agents may also be used singly or as mixtures. Water is used in amounts usually of 0.05–2.0% by weight, preferably of 0.20–1.0% by weight, based on the total amount of compounds having active hydrogens therein including the polyols used and the polyisocyanates used. The halogenated hydrocarbons are used in amounts usually of 0–12% by weight based on the total amount of the compounds having active hydrogens therein including the polyols used and the polyisocyanates used.

As surfactants, there may be used organosilicone surfactants, as well known in the art. However, it is necessary to form microcells to prevent the generation of voids in the resultant foam products, and from this standpoint, the use of L-5305 by Nippon Unicar, F-335 or F-337 by Shinethsu Silicone, or B-8407 or B-8408 by Gold Schmidt is preferred. These surfactants are used usually in amounts of 0.25-2 parts in relation to 100 parts by weight of the total of the polyols and polyisocyanates used.

Cross-linking agents may be used in the foaming. The cross-linking agents may be exemplified by glycols such as ethylene glycol, propylene glycol, diethylene glycol, triethylene glycol, dipropylene glycol, trimethylene glycol, 1,3-butanediol or 1,4-butanediol; alkanolamines such as diethanolamine or triethanolamine; aliphatic polyamines such as ethylenediamine, diethylenetriamine or triethylenetetramine; or aromatic diamines such as methylene-o-chloroaniline, 4,4'-diaminodiphenylmethane, 2,4-tolylenediamine or 2,6-tolylenediamine. These cross-linking agents may be used usually in amounts of 5-15 parts by weight in relation to 100 parts by weight of the polyols used.

There may be used a RIM method or an injection method with low or high pressure foaming machines. Usually molds are maintained at temperatures of 30°-70° C., preferably of 35°-60° C., into which the composition and the other additives as before described are injected at temperatures of 20-40° C., preferably of 25°-35° C.. The so-called pack ratio, a ratio of density of foams when free-foamed to density of foams as molded articles, is usually in the range of 1-5, preferably of 1.5-3.5.

The resultant rigid polyurethane foams have a density of 0.08-0.4 g/cm$^3$, preferably of 0.15-0.35 g/cm$^3$. As set forth above, since the method of the invention uses ethylene oxide adducts (I) to hydroquinone as a polyol component preferably together with adducts of ethylene oxide or propylene oxide or both to such specific polyfunctional monomeric compounds, the resultant rigid polyurethane foams have high heat resistance and toughness as well as high mechanical strength, but have no voids therein. Thus, the foams are very durable even when used in high temperature circumstances, and are suitable as strutural members of automobiles for interior or exterior use.

The invention will now be described more specifically with reference to examples, however, the invention is not limited thereto.

REFERENCE EXAMPLE 1

An amount of 5 kg of 1,4-bis(hydroxyethoxy)benzene was placed in a pressure reactor provided with a thermometer and a stirrer, and there were added thereto 50 g of potassium hydroxide flake. The inside of the reactor was displaced with nitrogen, and the mixture was heated to 120°-130° C. to melt the potassium hydroxide.

While maintaining the temperature of the mixture at 110°-130° C., 20.5 kg of ethylene oxide were added to the mixture over seven hours, and then the mixture was stirred for another one hour at the temperature. A small amount of unreacted ethylene oxide remained in the reactor was then stripped with nitrogen.

The reaction mixture was cooled to 90°-110° C., and small amounts of water and 250 g of synthetic magnesium silicate were added to the reaction mixture, and then the mixture was stirred for about one hour. Thereafter, the magnesium silicate was removed by filtration, and the residuals were dehydrated, followed by the addition thereto of 12 g of di-t-butylhydroxytoluene.

The thus obtained ethylene oxide adducts were pale yellow viscous liquid containing 0.02% of water. The adducts were found to have a hydroxyl value of 110 and a pH of 6.7, and contain 18.7 moles of ethylene oxide added per mole of 1,4-bis(hydroxyethoxy)benzene.

EXAMPLES 1-5 AND COMPARISON EXAMPLE 1

Compositions were prepared of which components are shown in the Table 1. The compositions were injected at temperatures of 28°-30° C. into molds of iron having a molding space of 1000 mm × 250 mm × 10 mm and maintained at 55° C., and foamed for 1.5 minutes, to provide rigid polyurethane foam sheets. The properties of the foam sheets are shown in the Table 1.

The polyols and polyisocyanates used were as follows.

Polyol A: propylene oxide adducts to sucrose/glycerine of a hydroxyl value of 460;

Polyol B: ethylene oxide adducts to trimethylolpropane of a hydroxyl value of 920;

Polyol C: ethylene oxide adducts to 1,4-bis(hydroxyethoxy)benzene of a hydroxyl value of 110; and Polyol D: propylene oxide adducts to sucrose/dipropylene glycol of a hydroxyl value of 500.

Polyisocyanate: polyphenylenepolymethylene polyisocyanate (Millionate MR-200 by Nippon Polyurethane Kogyo K.K.).

Test specimens of 13 mm × 110 mm × 10 mm (thick) and 30 × 30 × 10 mm (thick) were prepared. With the former flexural strength and modulus were measured with a span of 50.8 mm, while with the latter compressive strength was measured by compressing the specimens by 30% in the direction of thickness. The results are shown in the Table 1 as properties as produced.

The specimens were left standing at 100° C. for 1000 hours, and then flexural strength, flexural modulus and compressive strength were measured in the same manner as above. The results are shown in the Table 1 as properties after durability test.

As seen, the foams according to the invention are well-balanced in strength and toughness, but also of high heat resistance, and hence of high durability.

EXAMPLE 6

Door linings, pillar garnishes and dashboard panels were produced by use of the compositions of the Examples 1-5 and the Comparison Example 1, and mounted on an automobile. The durability test was conducted over 1000 hours under the conditions of vibration of 1.0-5.0 G, amplitude of 1.0-40.0 Hz. Neither cracks nor distortion was found in the molded articles of the compositions of the Examples, but cracks and distortion were found in the molded articles of the compositions of the Comparison Example 1.

TABLE 1

|  | Examples | | | | | Comparison |
| --- | --- | --- | --- | --- | --- | --- |
|  | 1 | 2 | 3 | 4 | 5 | 1 |
| COMPOSITIONS* | | | | | | |
| Polyol A | 45 | 50 | 35 | 50 | — | 100 |
| Polyol B | 25 | 25 | 25 | 25 | 25 | — |
| Polyol C | 30 | 25 | 40 | 25 | 40 | — |
| Polyol D | — | — | — | — | 35 | — |
| Ethylene glycol | 10 | 10 | 10 | 10 | 10 | 10 |
| Water | 1.0 | 1.0 | 1.0 | 1.0 | 1.0 | 1.0 |
| Freon-11 | 6.0 | 6.0 | 6.0 | 2.0 | 2.0 | 6.0 |
| Dabco 33 LV | 1.5 | 1.5 | 1.5 | 1.5 | 1.8 | 1.5 |
| F-335 | 1.0 | 1.0 | 1.0 | 1.0 | 1.0 | 1.0 |
| Isocyanate Index | 1.05 | 1.05 | 1.05 | 1.05 | 1.05 | 1.05 |
| FOAMS | | | | | | |
| As Produced | | | | | | |
| Density (g/cm$^3$) | 0.2 | 0.2 | 0.2 | 0.3 | 0.3 | 0.2 |
| Flexural strength (kg/cm$^2$) | 68 | 62 | 72 | 110 | 103 | 76 |
| Flexural modulus (kg/cm$^2$) | 930 | 870 | 1080 | 2800 | 2600 | 1240 |
| Compression strength (kg/cm$^2$) | 18.3 | 17.1 | 20.4 | 36.4 | 33.4 | 22.4 |
| After Durability Test | | | | | | |
| Flexural strength (kg/cm$^2$) | 63 | 61.5 | 73 | 103 | 98 | 38 |
| Flexural modulus (kg/cm$^2$) | 948 | 860 | 1010 | 2870 | 2480 | 740 |
| Compression strength (kg/cm$^2$) | 18.8 | 17.0 | 20.3 | 34.7 | 34.2 | 13.6 |

Notes:
*parts by weight

What is claimed is:

1. A method of producing interior and exterior structural members of automobiles composed of rigid polyurethane foam, which comprises foaming a composition comprising:
   (a) polyisocyanates selected from the group consisting of diphenylmethane diisocyanate, polyphenylenepolymethylene polyisocyanate and their modified products; and
   (b) polyols which have a hydroxyl value of 400–550 and contain an ethylene oxide adduct to hydroquinone having a hydroxyl value of 60–430 in amounts of 20–40% by weight based on the polyols, the adduct being represented by the general formula of

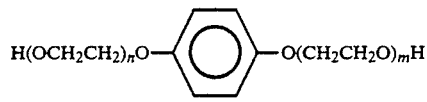

wherein m and n are integers of not less than 1, respectively.

2. A method of producing interior and exterior structural members of automobiles composed of rigid polyurethane foam, which comprises foaming a composition comprising:
   (a) polyisocyanates selected from the group consisting of diphenylmethane diisocyanate, polyphenylenepolymethylene polyisocyanate and their modified products; and
   (b) polyols which have a hydroxyl value of 400–550 and contain:
   (i) an ethylene oxide adduct to hydroquinone as a first polyol having a hydroxyl value of 60–430 in amounts of 20–40% by weight based on the polyols, the adduct being represented by the general formula of

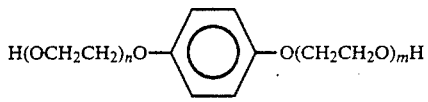

wherein m and n are integers of not less than 1, respectively; and
   (ii) a second polyol selected from the group consisting of alkylene oxide adducts to at least one member of three or more functional polyhydric alcohols and polyamino compounds.

3. The method as claimed in claim 2 wherein the second polyol has a hydroxyl value of not less than 400.

4. The method as claimed in claim 2 wherein the second polyol has a hydroxyl value of 450–1000.

5. The method as claimed in claim 2 wherein the second polyol is at least one member selected from the group consisting of alkylene oxide adducts to aliphatic polyhydric alcohols, alicyclic polyhydric alcohols and polyamino compounds.

6. The method as claimed in claim 2 wherein the second polyol is at least one member selected from the group consisting of alkylene oxide adducts to sucrose, glycerine and trimethylolpropane.

7. The method as claimed in claim 2 wherein the polyols further contain alkylene oxide adducts to glycols as a third polyol.

* * * * *